United States Patent
Tsuchiya et al.

(10) Patent No.: US 6,320,722 B1
(45) Date of Patent: Nov. 20, 2001

(54) CARTRIDGE MIS-INSERTION PREVENTING MECHANISM

(75) Inventors: Manabu Tsuchiya; Toshimitsu Kawasaki, both of Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/688,866

(22) Filed: Oct. 17, 2000

(30) Foreign Application Priority Data

Oct. 18, 1999 (JP) ................................. 11-295878

(51) Int. Cl.$^7$ ................................. G11B 17/00
(52) U.S. Cl. ................................. 360/96.5
(58) Field of Search ................. 360/96.5, 99.06, 360/99.02; 369/75.1, 75.2, 77.1, 77.2

(56) References Cited

U.S. PATENT DOCUMENTS

| | | | |
|---|---|---|---|
| 5,396,381 | * 3/1995 | Yamano et al. | 360/96.5 |
| 5,493,460 | * 2/1996 | Lee | 360/96.5 |
| 5,500,778 | * 3/1996 | Ahn | 360/96.5 |
| 5,577,014 | * 11/1996 | Kawamura | 360/99.06 |
| 5,831,794 | * 11/1998 | Uwabo et al. | 360/99.06 |
| 5,854,723 | * 12/1998 | Suzuki | 360/96.5 |
| 5,923,497 | * 7/1999 | Suzuki | 360/96.5 |
| 6,141,180 | * 10/2000 | Smith | 360/96.5 |
| 6,172,841 | * 1/2001 | Kobayashi | 360/96.5 |
| 6,188,541 | * 2/2001 | Ohkita et al. | 360/96.5 |

FOREIGN PATENT DOCUMENTS

| | | |
|---|---|---|
| 2-79251 | 3/1990 | (JP) . |
| 2-94158 | 4/1990 | (JP) . |
| 7-73646 | 3/1995 | (JP) . |
| 8-180533 | 7/1996 | (JP) . |
| 11-110940 | 4/1999 | (JP) . |

* cited by examiner

*Primary Examiner*—Allen Cao
(74) *Attorney, Agent, or Firm*—Sughrue, Mion, Zinn, Macpeak & Seas, PLLC

(57) ABSTRACT

A cartridge mis-insertion preventing mechanism, comprising: a cartridge tray into which a cartridge is insertable; a loader plate into which the cartridge tray is insertable; a cartridge locking mechanism for locking the cartridge to the cartridge tray; a loading locking mechanism for preventing the cartridge tray and the loader plate from being inserted into a loader guide plate; and a restricting mechanism for changing the loading locking mechanism from a lock state to an unlock state only when the cartridge has been inserted into the cartridge tray in a correct direction; wherein the cartridge tray and the loader plate are inserted into the loader guide plate along with the cartridge when the cartridge is further inserted after the loading locking mechanism has been changed from the lock state to the unlock state; wherein before the cartridge is inserted into the cartridge tray, the cartridge locking mechanism is in an unlock state; wherein when the cartridge tray and the loader plate along with the cartridge have been inserted into the loader guide plate, the cartridge locking mechanism is changed from the unlock state to a lock state; and wherein before the cartridge is inserted into the cartridge tray, the loading locking mechanism is in the lock state.

6 Claims, 14 Drawing Sheets

INSERTING DIRECTION

INSERTING DIRECTION

FIG. 3A
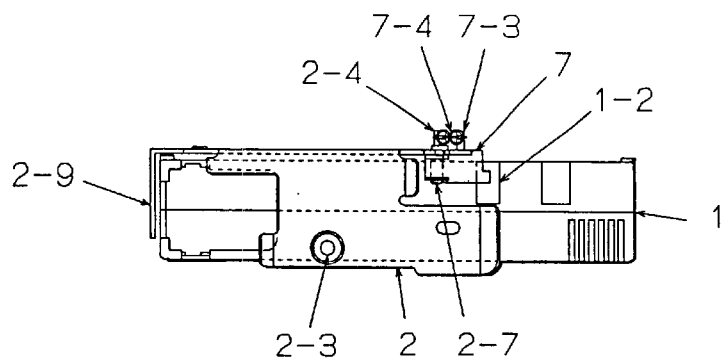
FIG. 3B  FIG. 3C
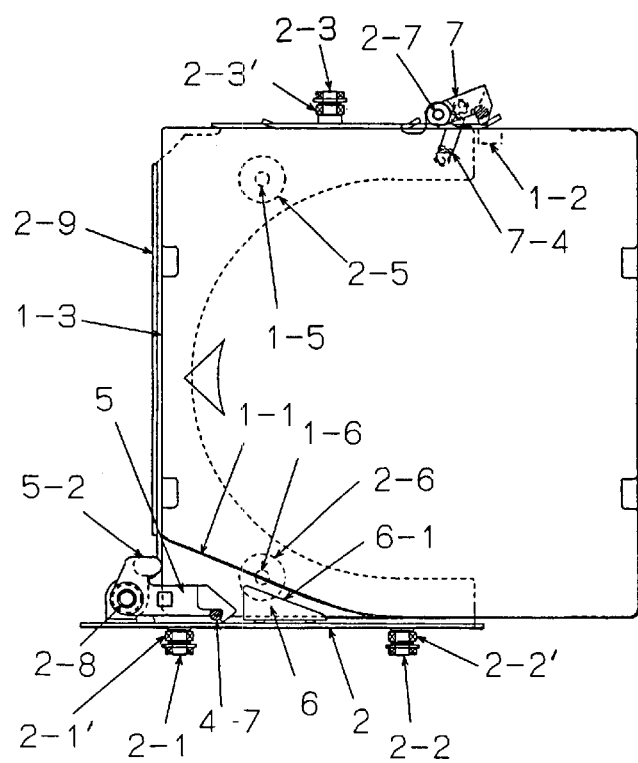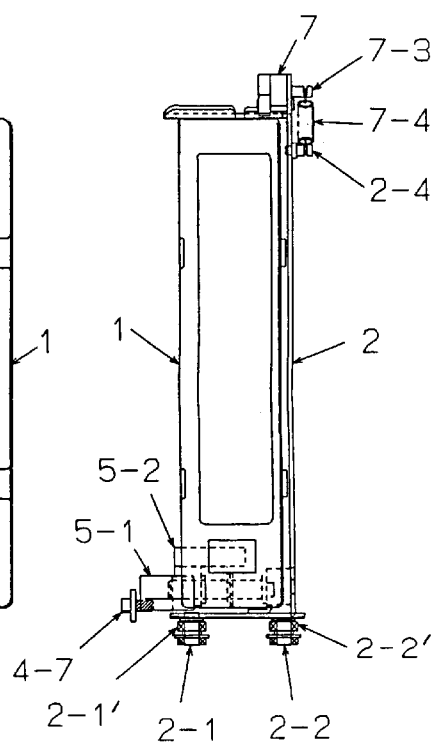
FIG. 3D
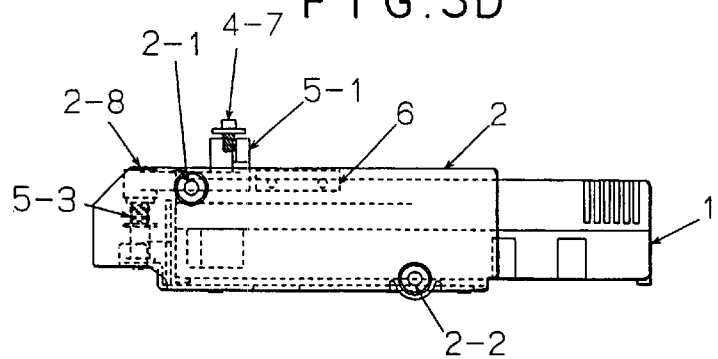

F I G. 14A
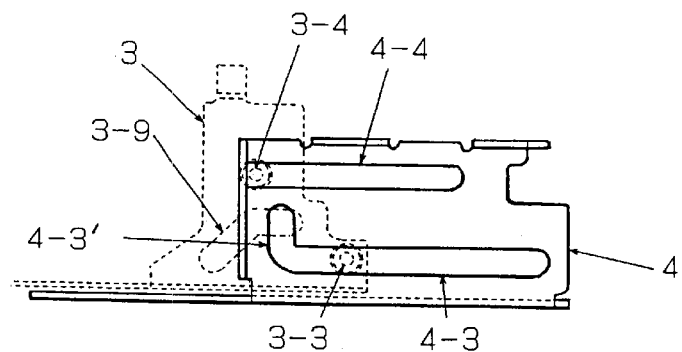
F I G. 14B
F I G. 14C
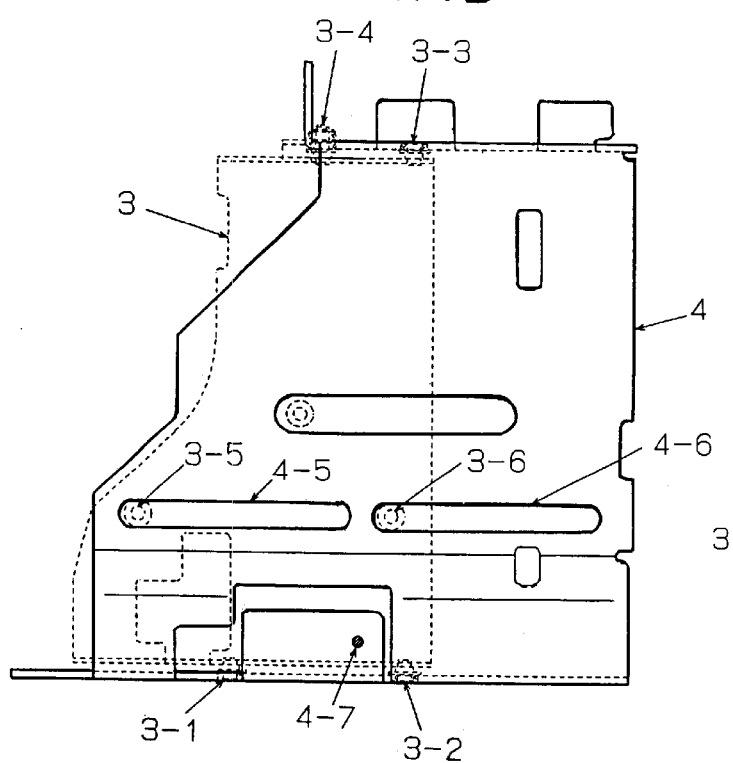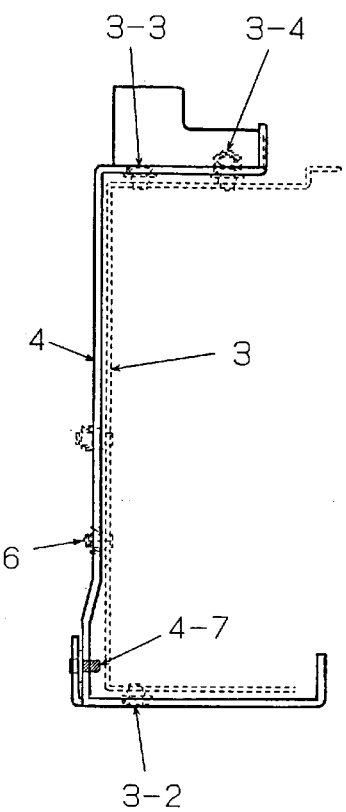
F I G. 14D
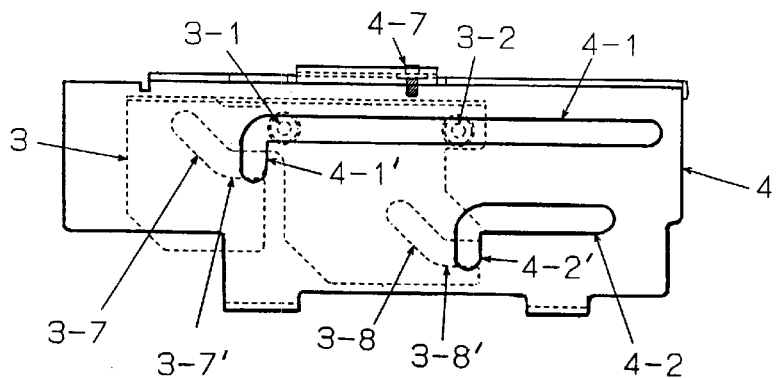

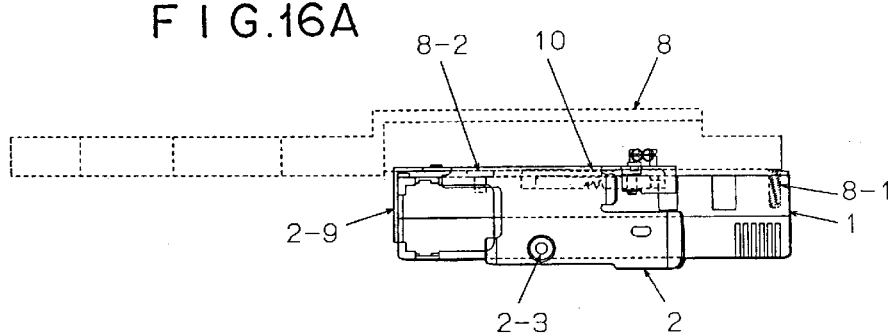
FIG.16A
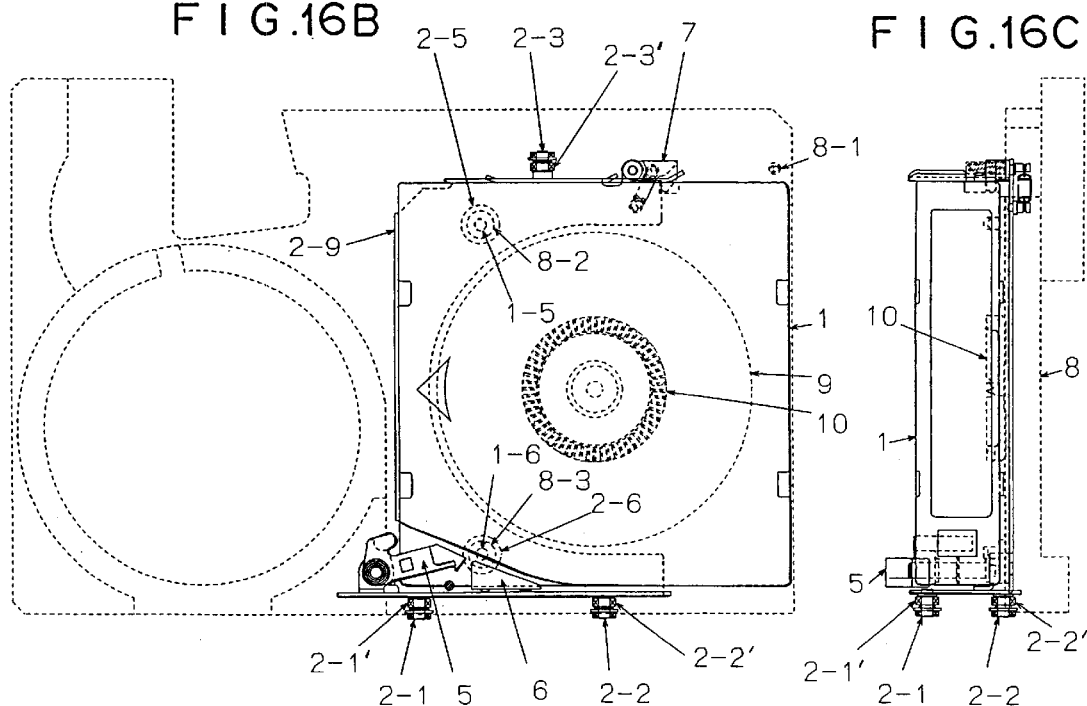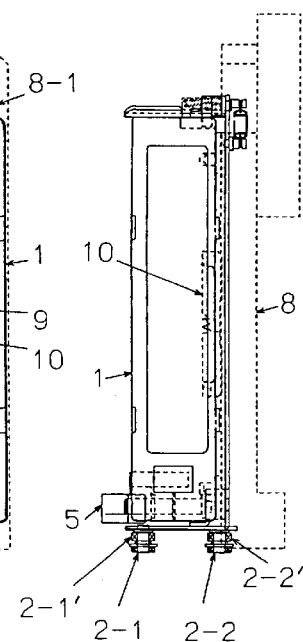
FIG.16B   FIG.16C
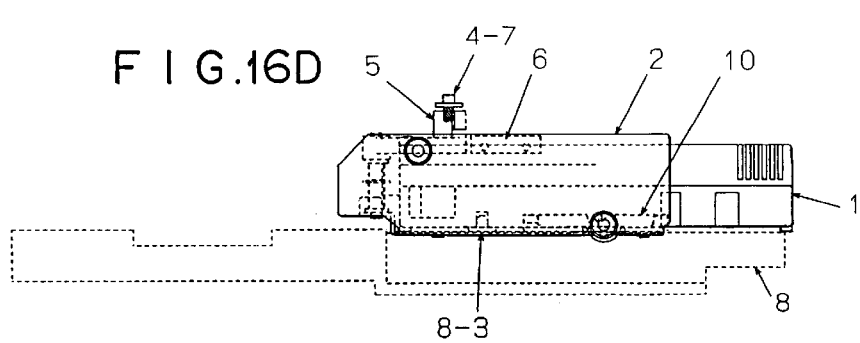
FIG.16D

CARTRIDGE MIS-INSERTION PREVENTING MECHANISM

BACKGROUND OF THE INVENTION

1. Field of the Invention

The present invention relates to a mechanism for preventing a cartridge from being inserted in the incorrect direction and in particular, the mechanism for use with a magnetic tape apparatus.

2. The Prior Art

FIG. 1 shows the structure of a conventional tray locking mechanism. Referring to FIG. 1, lock lever 11 is rotatably mounted on a cartridge tray with pin 2-8. In the state that a cartridge has not been inserted, since lock lever securing portion 11-2 disposed on lock lever 11 is pressed to lock pin 4-7 with a predetermined means (not shown), lock lever 11 prevents the cartridge tray from being moved (this state is referred to as loading lock). In this state, since lock lever 11 protrudes, unless cartridge 1 is inserted in the correct direction, front end portion 11-1 blocks the cartridge, thereby preventing cartridge 1 from being loaded. On the other hand, when cartridge 1 is inserted in the correct direction, front end portion 11-1 is raised along notch 1-1, thereby causing the loading lock to be deactivated. Thus, in the conventional mechanism, lock lever 11 functions as both the loading lock operation and the mis-insertion preventing mechanism.

In the conventional mechanism, the timing at which the loading lock is deactivated is early. In other words, before the cartridge 1 is inserted into the position at which the cartridge 1 is securely locked, the loading lock is deactivated. Thus, a loading malfunction takes place. As a result, reel face gear 1-4 is improperly engaged with drive motor face gear 10.

SUMMARY OF THE INVENTION

An object of the present invention is to provide a mechanism which securely prevents a cartridge from being inserted in the incorrect direction.

According to a first aspect of the present invention, there is provided a cartridge mis-insertion preventing mechanism, comprising: a cartridge tray into which a cartridge is insertable; a loader plate into which the cartridge tray is insertable; a cartridge locking mechanism for locking the cartridge to the cartridge tray; a loading locking mechanism for preventing the cartridge tray and the loader plate from being inserted into a loader guide plate; and a restricting mechanism for changing the loading locking mechanism from a lock state to an unlock state only when the cartridge has been inserted into the cartridge tray in a correct direction; wherein the cartridge tray and the loader plate are inserted into the loader guide plate along with the cartridge when the cartridge is further inserted after the loading locking mechanism has been changed from the lock state to the unlock state; wherein before the cartridge is inserted into the cartridge tray, the cartridge locking mechanism is in an unlock state; wherein when the cartridge tray and the loader plate along with the cartridge have been inserted into the loader guide plate, the cartridge locking mechanism is changed from the unlock state to a lock state; and wherein before the cartridge is inserted into the cartridge tray, the loading locking mechanism is in the lock state.

In the cartridge mis-insertion preventing mechanism, the cartridge locking mechanism may comprise: a cartridge lock lever which has a first hook engageable with a lock hole of the cartridge and is rotatably disposed on the cartridge tray; a first pin for rotating the cartridge lock lever to an angle at which the lock hole is disengaged from the first hook when the cartridge tray and the loader plate have not been inserted into the loader guide plate; and a first spring for rotating the cartridge lock lever in a direction reverse to the direction of the rotation by the first pin.

In the cartridge mis-insertion preventing mechanism, the loading locking mechanism may comprise: a tray lock lever which has a cam portion and a second hook and is rotatably disposed on the cartridge tray, the cam portion being pushed by an end surface in the inserting direction of the cartridge; a second pin fixed and engageable with the second hook; and a second spring for rotating the tray lock lever so that the second hook is engaged with the second pin; wherein when the cam portion is pushed by the end surface in the inserting direction of the cartridge, the tray lock lever is rotated so that the second lever is disengaged from the second pin.

In the cartridge mis-insertion preventing mechanism, the restriction mechanism may be a stopper disposed on the cartridge tray; wherein when the cartridge is inserted into the cartridge tray in an incorrect direction, the cartridge contacts the stopper; and wherein when the cartridge is inserted into the cartridge tray in the correct direction, the cartridge does not contact the stopper.

In the cartridge mis-insertion preventing mechanism, the operation in which said cartridge tray and said loader plate are inserted into said loader guide plate along with said cartridge may be caused by an end surface of the cartridge tray being pushed by an end surface in the inserting direction of the cartridge.

According to a second aspect of the present invention, there is provided a loading locking mechanism comprising: a tray lock lever which has a cam portion and a hook and is rotatably disposed on a cartridge tray, the cam portion being pushed by an end surface in the inserting direction of a cartridge; a pin fixed and engageable with the hook; and a spring for rotating the tray lock lever so that the hook is engaged with the pin; wherein when the cam portion is pushed by the end surface in the inserting direction of the cartridge, the tray lock lever is rotated so that the lever is disengaged from the second pin.

These and other objects, features and advantages of the present invention will become more apparent in light of the following detailed description of a best mode embodiment thereof, as illustrated in the accompanying drawings.

BRIEF DESCRIPTION OF DRAWINGS

FIGS. 3A, 3B, 3C, and 3D are a left side view, a plan view, a front view, and a right side view, respectively, showing the state that the magnetic tape cartridge has been inserted in the correct direction into a cartridge tray according to the embodiment of the present invention;

FIGS. 14A, 14B, 14C, and 14D are a left side view, a plan view, a front view, and a right side view, respectively, showing the case that the loader plate has been placed inside the loader guide plate after the loading operation has been performed according to the embodiment of the present invention;

FIGS. 16A, 16B, 16C, and 16D are a left side view, a plan view, a front view, and a right side view, respectively, showing the positions of the magnetic tape cartridge and the cartridge tray after the loading operation has been performed according to the embodiment of the present invention.

DESCRIPTION OF PREFERRED EMBODIMENT

Next, with reference to the accompanying drawings, an embodiment of the present invention will be explained.

Figure 1A:
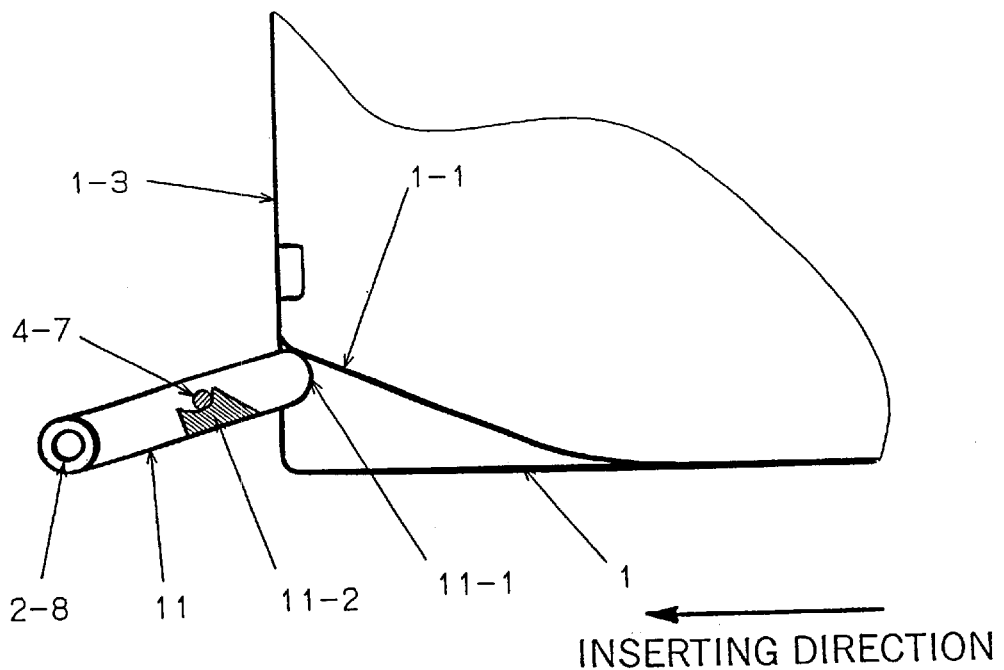
FIGS. 1A and 1B are plan views showing the structure of a mechanism in common with a loading lock function and a mis-insertion preventing function as a related art reference.
Figure 1B:
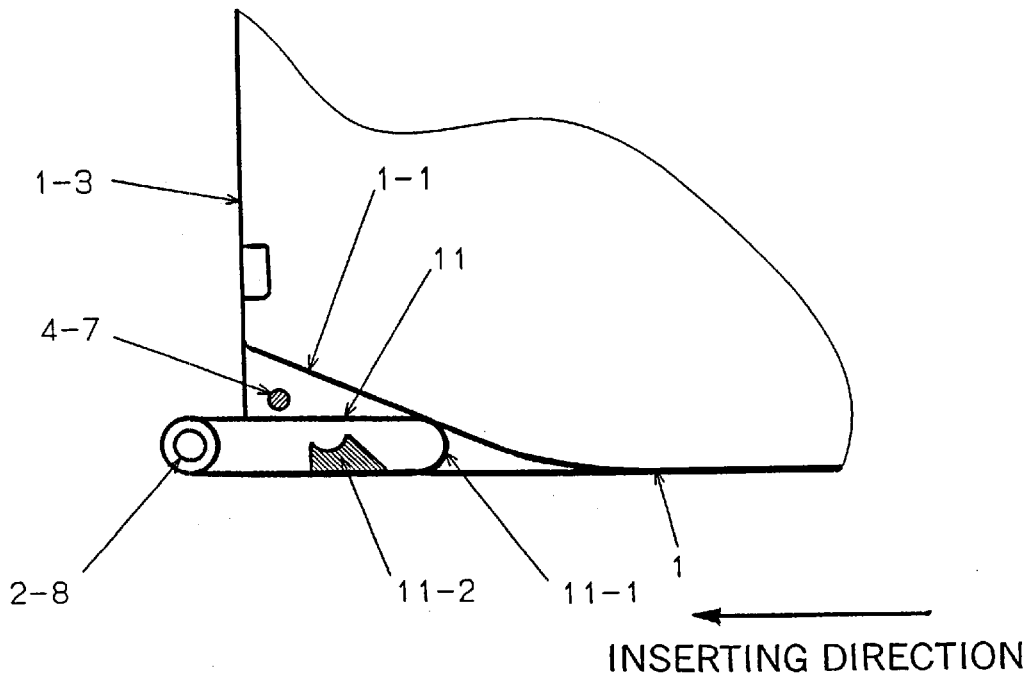
Figure 2A:
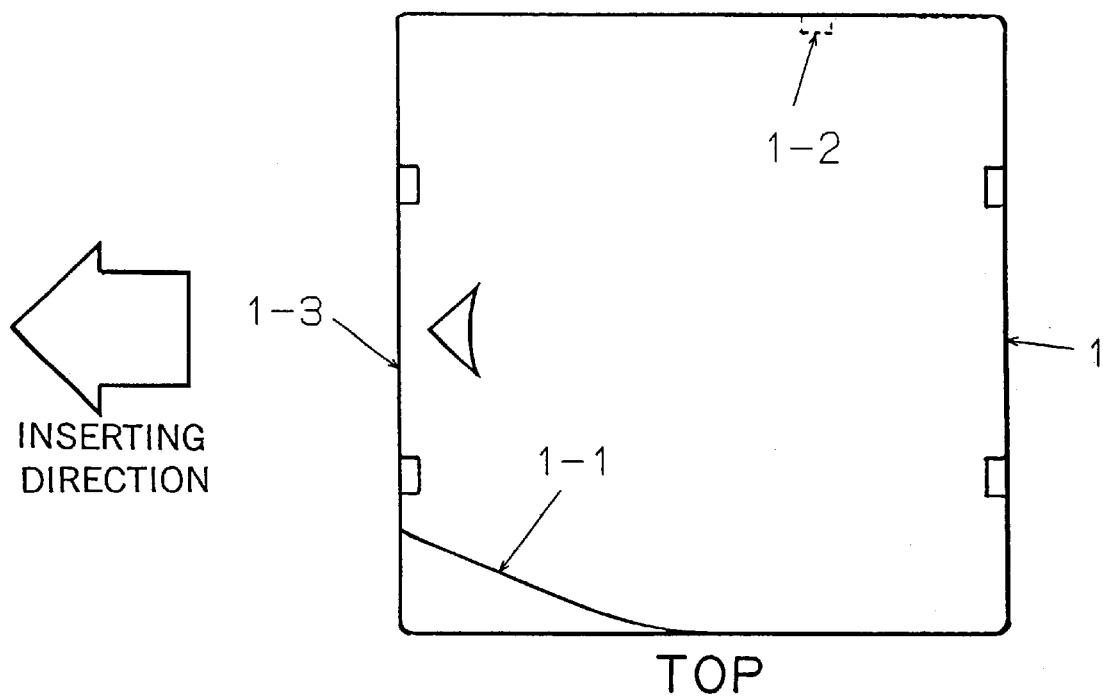
FIG. 2A is a top plan view showing a magnetic tape cartridge according to an embodiment of the present invention.
Figure 2B:
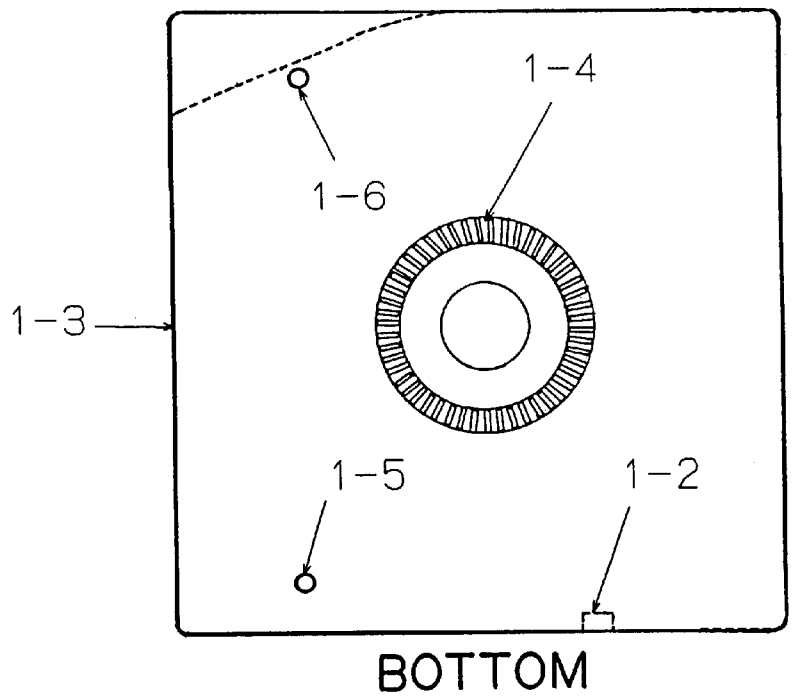
FIG. 2B is a bottom plan view showing the magnetic tape cartridge according to the embodiment of the present invention.

Referring FIGS. 2A and 2B, notch 1-1 is formed on the left side surface in the inserting direction of a magnetic tape cartridge 1. Lock hole 1-2 is formed at a lower portion on the right side surface of the magnetic tape cartridge 1. End surface 1-3 is formed in the inserting direction on magnetic tape cartridge 1. End surface 1-3 is a flat surface. Reel face gear 1-4 and aligning holes 1-5 and 1-6 are disposed on the rear surface of magnetic tape cartridge 1.

A loading mechanism loads magnetic tape cartridge 1. The loading mechanism is composed of cartridge tray 2 (shown in FIGS. 3A to 3D), loader plate 3 (shown in FIGS. 6A to 6D), and loader guide plate 4 (shown in FIGS. 7A to 7D). Cartridge tray 2 holds magnetic tape cartridge 1. Loader plate 3 slidably moves cartridge tray 2. Loader guide plate 4 has a guide groove on which cartridge tray 2 and loader plate 3 slidably move.

Referring to FIGS. 3A to 3D, the cartridge tray 2 has bearings 2-1, 2-2, and 2-3 and bearings 2-1', 2-2', and 2-3' on the left side surface and the right side surface. The bearings 2-1, 2-2, and 2-3 are coaxial with the bearings 2-1', 2-2', and 2-3', respectively. Spring hook pin 2-4 is formed at a lower portion of cartridge tray 2. Holes 2-5 and 2-6 are formed at a lower portion of cartridge tray 2. Holes 2-5 and 2-6 allow aligning pins 8-2 and 8-3 to pass therethrough, respectively. Cartridge tray end surface 2-9 is formed on a rear portion of cartridge tray 2. Cartridge tray end surface 2-9 contacts end surface 1-3 of cartridge 1. Cartridge tray 2 has cartridge lock lever 7, tray lock lever 5 and stopper 6. Cartridge tray lock lever 7 holds and locks magnetic tape cartridge 1 when cartridge 1 is loaded. Tray lock lever 5 prevents magnetic tape cartridge 1 from being improperly loaded when magnetic tape cartridge 1 is inserted in the incorrect direction. Stopper 6 prevents the magnetic tape cartridge 1 from being inserted in the incorrect direction.

Figure 4:
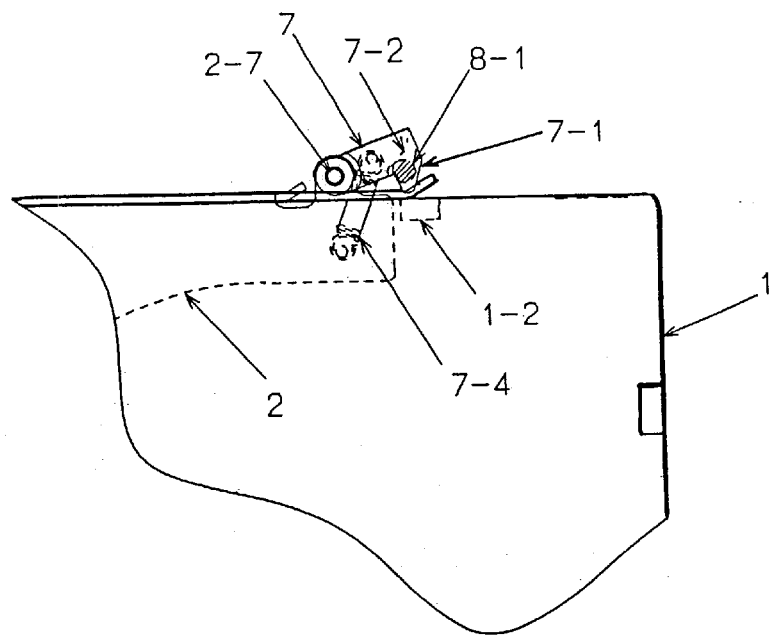
FIG. 4 is an enlarged partial plan view showing a peripheral portion of a hook shown in FIG. 3 in the case that the cartridge locking mechanism is in an unlock state before the loading operation is performed.

Referring to FIG. 4, cartridge lock lever 7 is rotatably attached to pin 2-7 fixed on the right side of cartridge tray 2. Hook 7-1 is disposed at the top of cartridge lock lever 7. Cartridge lock lever 7 has inclined portion 7-2 beneath hook 7. Inclined portion 7-2 has a recessed sidewall. Spring 7-4 is disposed between spring hook pin 7-3 and spring hook pin 2-4. Spring hook pin 7-3 is disposed at a lower portion of cartridge lock lever 7. Spring hook pin 2-4 is disposed on the rear surface of cartridge tray 2. Spring 7-4 causes cartridge lock lever 7 to be tensioned toward the inner surface side of cartridge tray 2.

Figure 5:
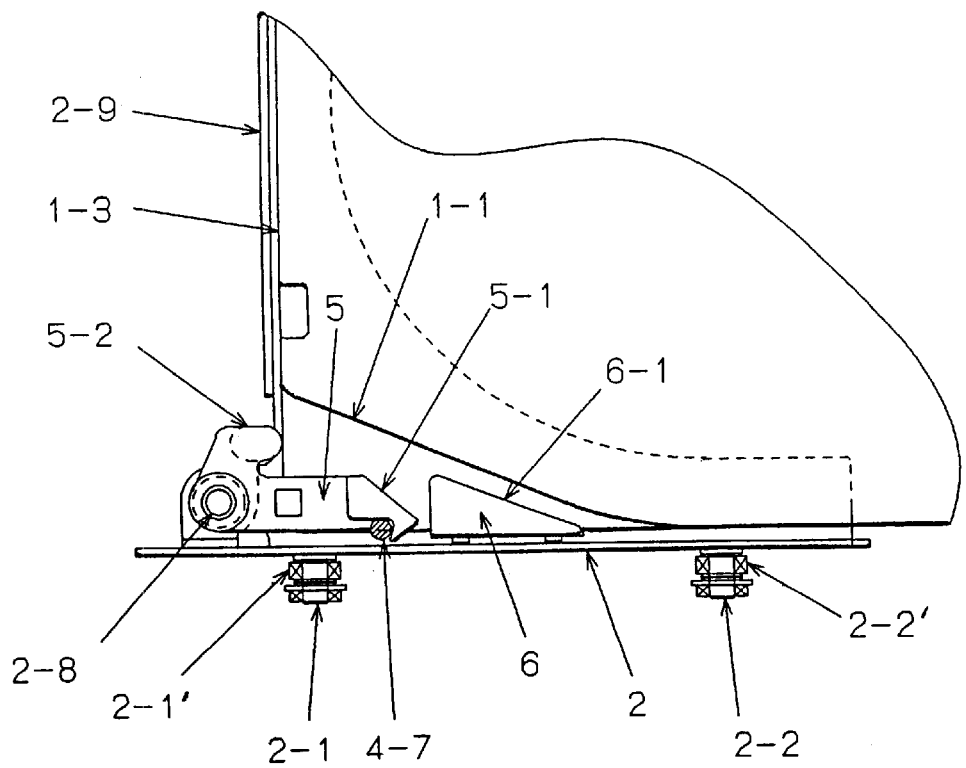
FIG. 5 is an enlarged partial plan view showing a peripheral portion of a tray lock lever shown in FIG. 3 in the case that the loading locking mechanism is in the lock state before the loading operation is performed.
Figure 6A:
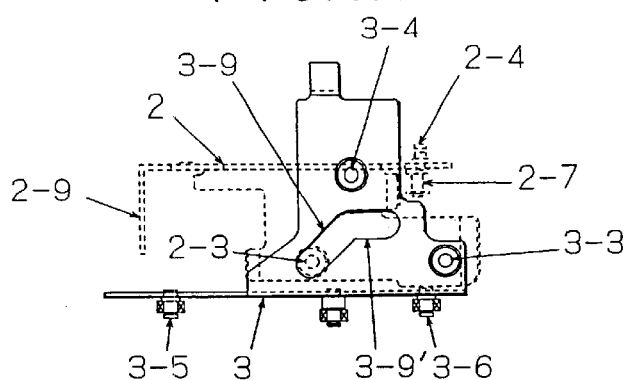
FIGS. 6A, 6B, 6C, and 6D are a left side view, a plan view, a front view, and a right side view, respectively, showing the case that the cartridge tray has been placed inside a loader plate before the loading operation is performed according to the embodiment of the present invention.
Figure 6B:
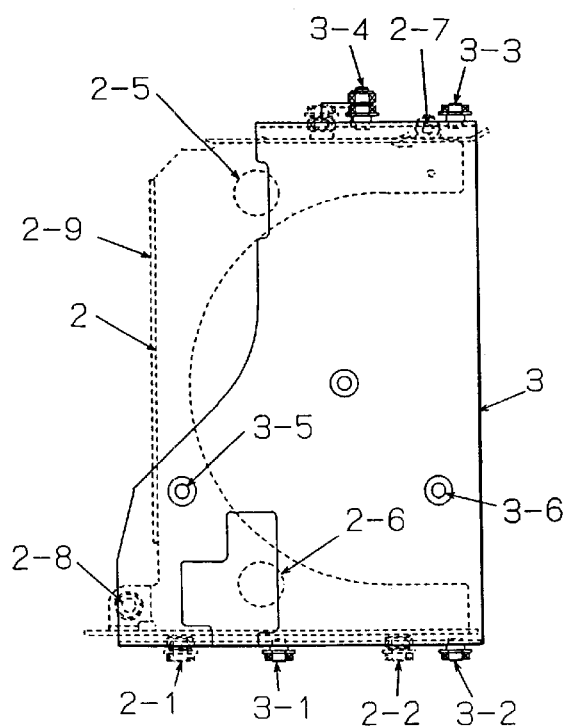
Figure 6C:
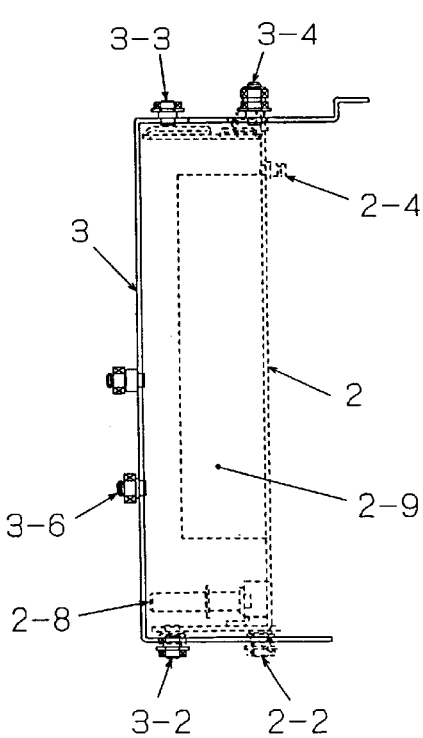
Figure 6D:
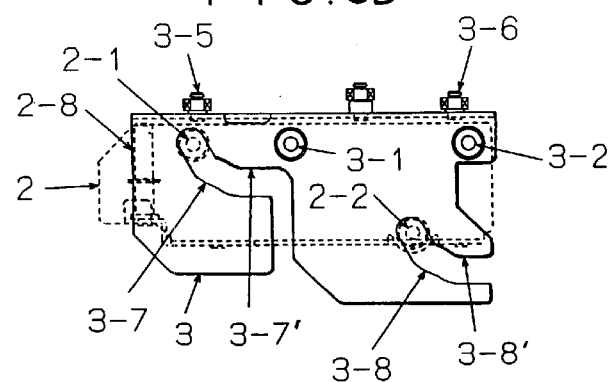
Figure 7A:
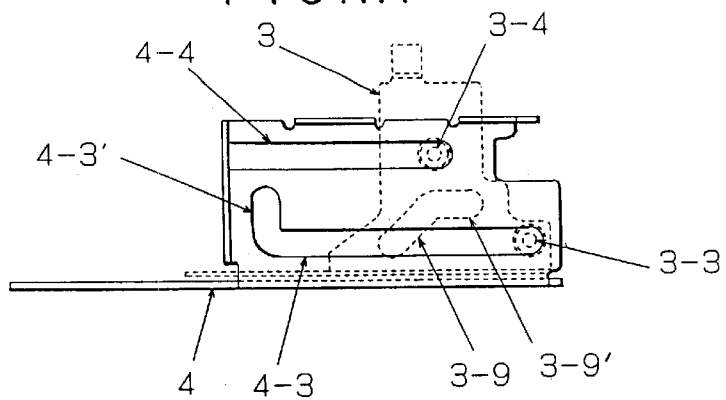
FIGS. 7A, 7B, 7C, and 7D are a left side view, a plan view, a front view, and a right side view, respectively showing the case that the loader plate has been placed inside a loader guide plate before the loading operation is performed according to the embodiment of the present invention.
Figure 7B:
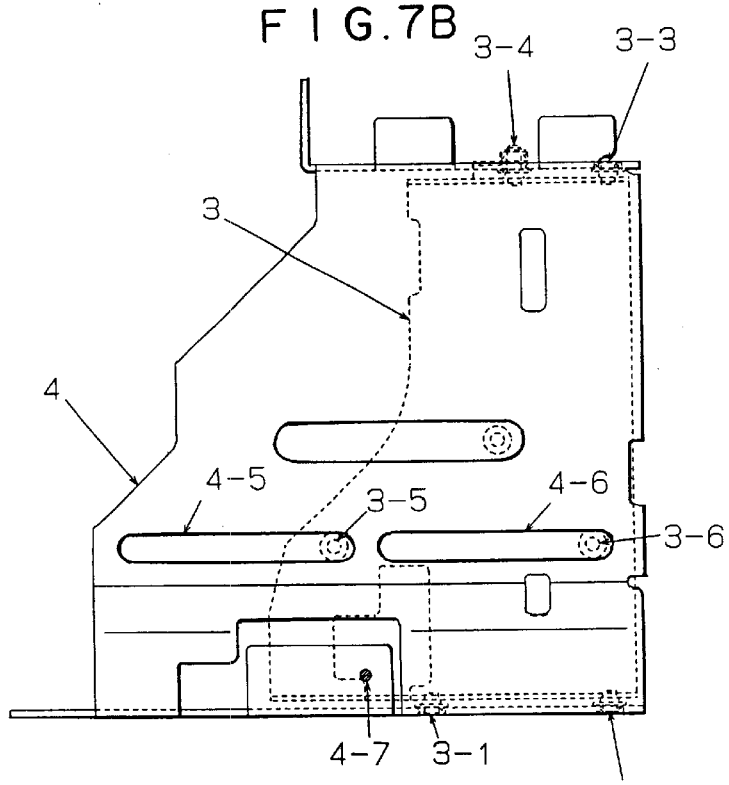
Figure 7C:
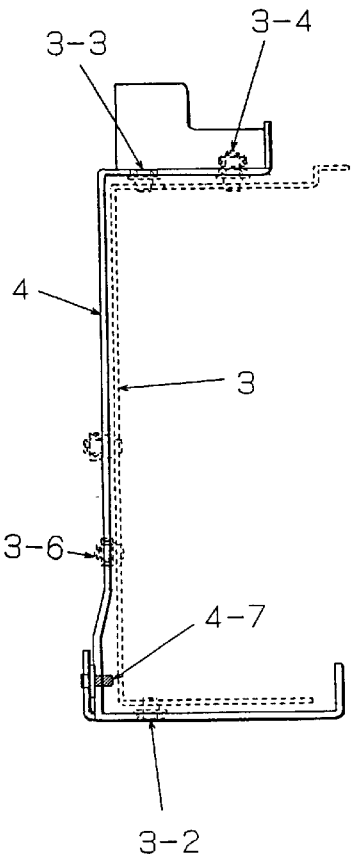
Figure 7D:
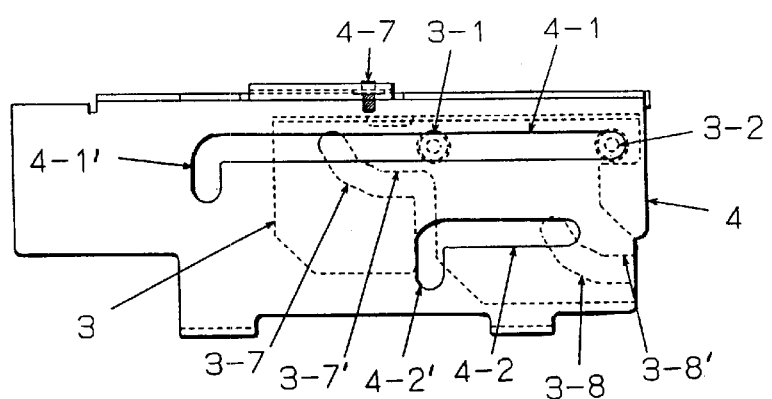
Figure 8A:
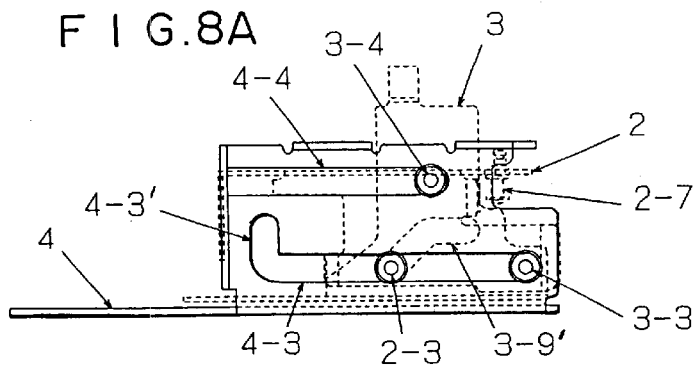
FIGS. 8A, 8B, 8C, and 8D are a left side view, a plan view, a front view, and a right side view, respectively, showing the case that the cartridge tray, the loader plate, and the loader guide plate have been assembled before the loading operation is performed according to the embodiment of the present invention.
Figure 8B:
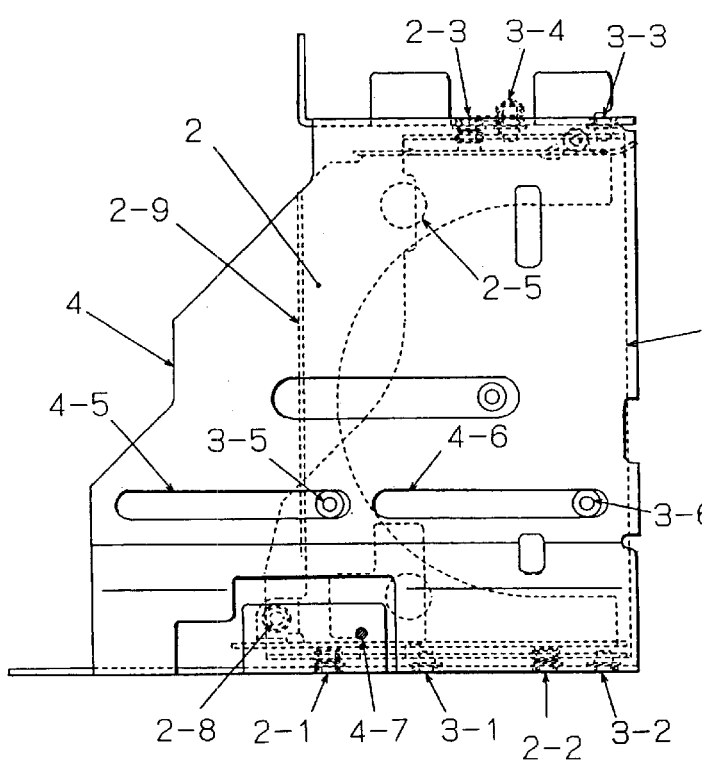
Figure 8C:
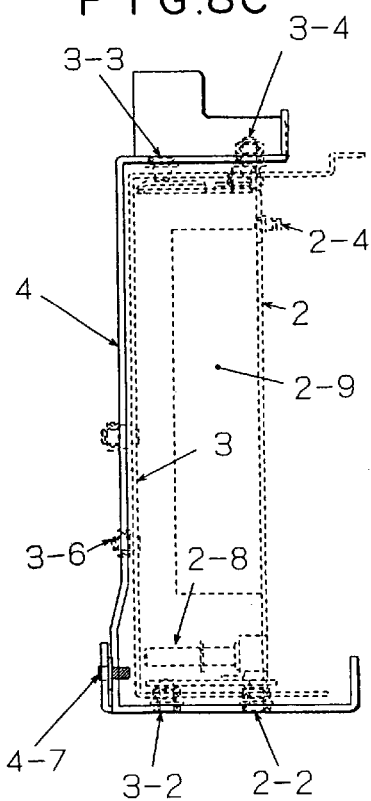
Figure 8D:
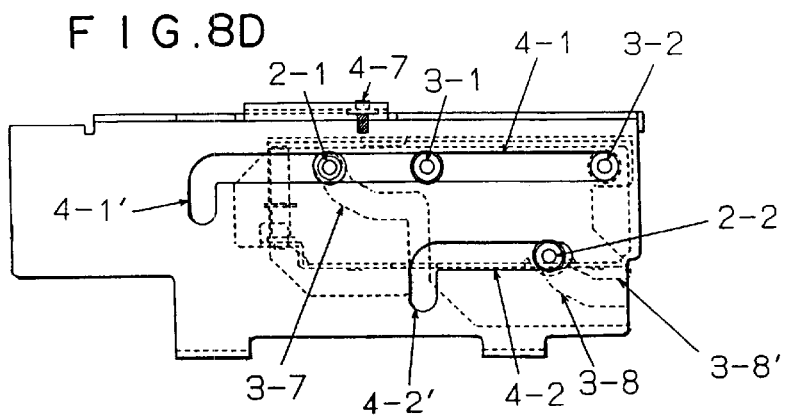
Figure 9A:
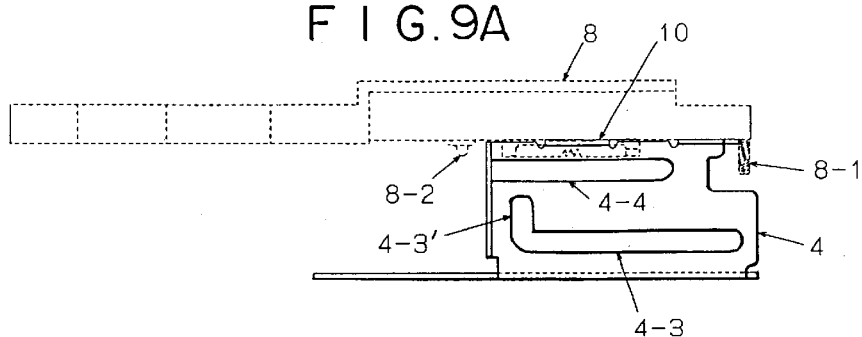
FIGS. 9A, 9B, 9C, and 9D are a left side view, a plan view, a front view, and a right side view, respectively, showing a deck base, and the loader guide plate and so forth disposed thereon according to the embodiment of the present invention.
Figure 9B:
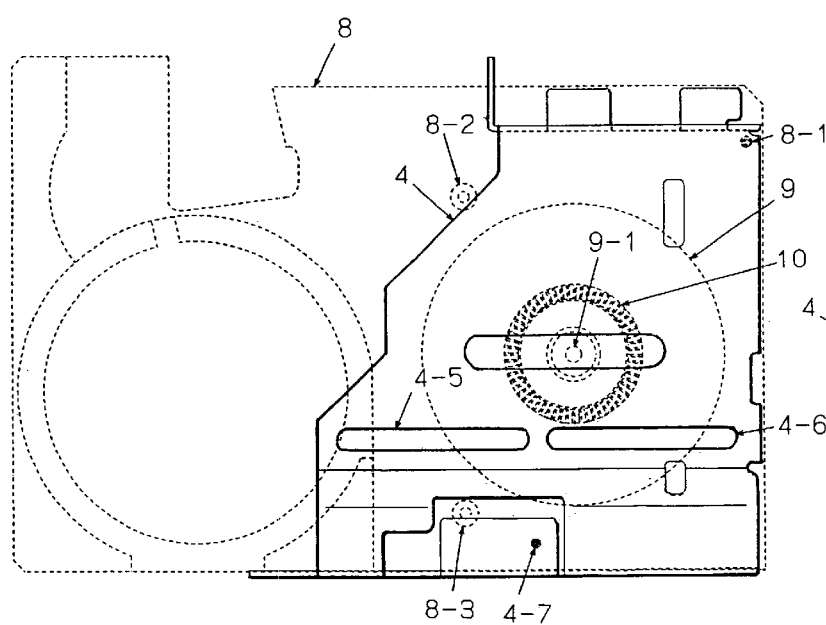
Figure 9C:
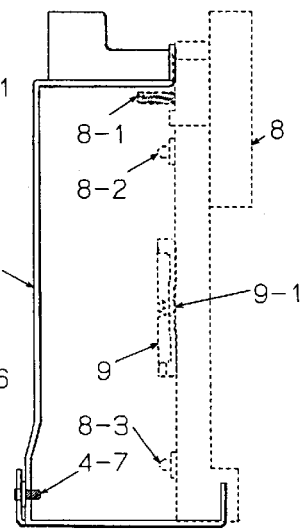
Figure 9D:
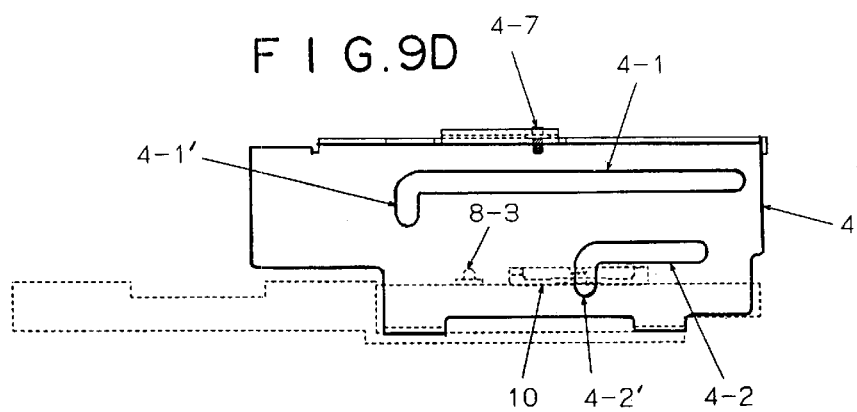
Figure 10A:
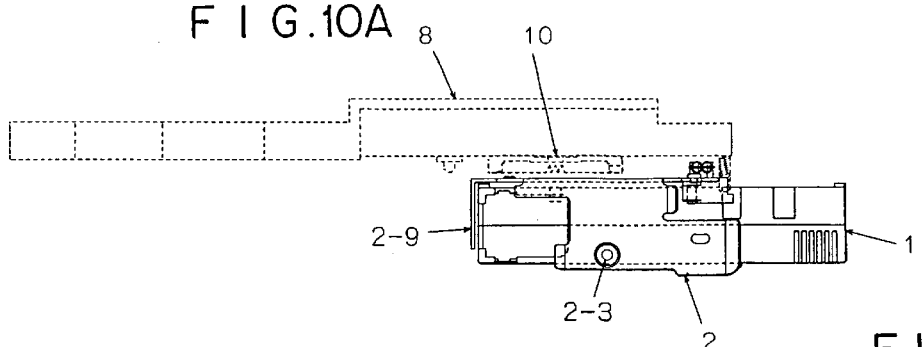
FIGS. 10A, 10B, 10C, and 10D are a left side view, a plan view, a front view, and a right side view showing the positions of the magnetic tape cartridge and the cartridge tray before the loading operation is performed according to the embodiment of the present invention.
Figure 10B:
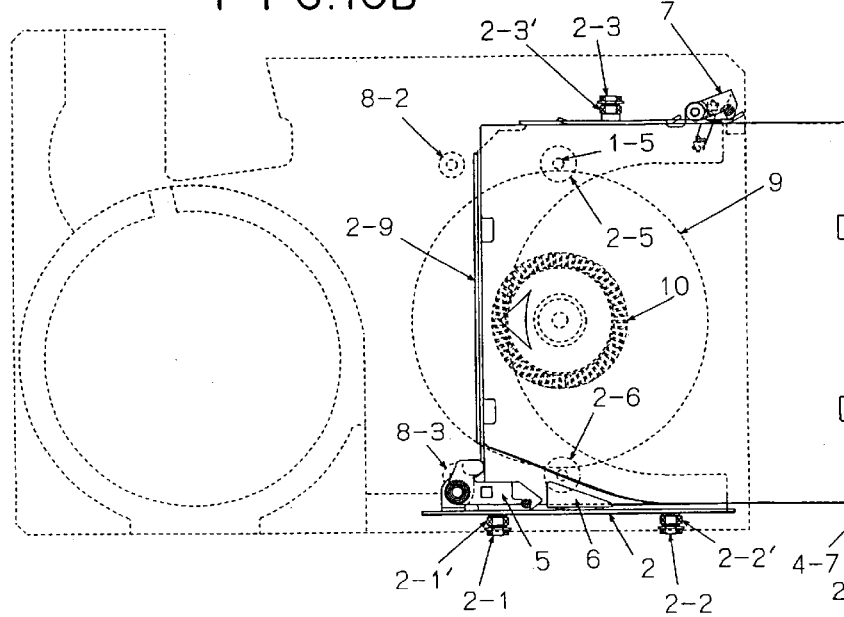
Figure 10C:
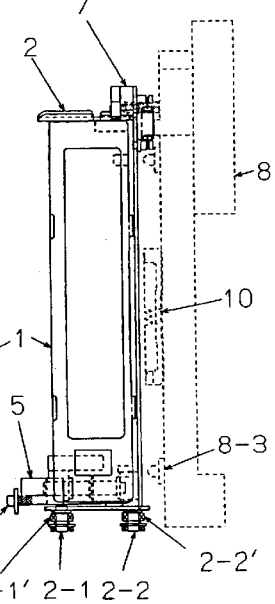
Figure 10D:
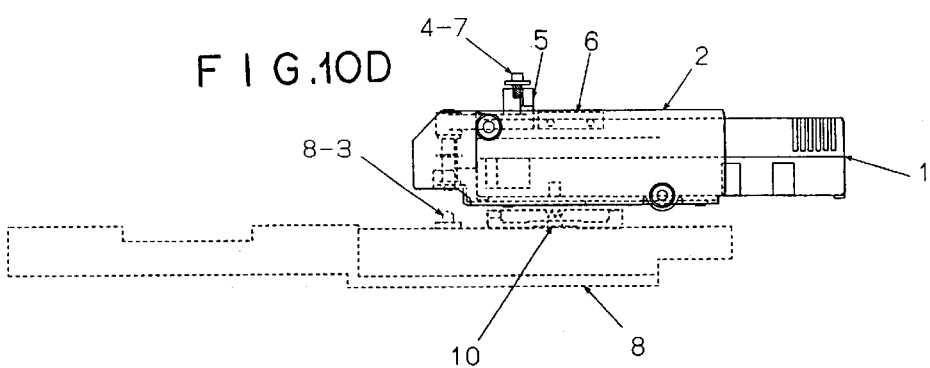

Referring to FIG. 5, tray lock lever 5 is rotatably attached to pin 2-8 fixed at a rear portion of cartridge tray 2. spring 5-3 (shown in FIG. 3D) is disposed between tray lock lever 5 and pin 2-8. Spring 5-3 causes tray lock lever 5 to be tensioned to the inner wall direction of cartridge tray 2. Hook 5-1 is disposed at the front edge of tray lock lever 5. Cam 5-2 is disposed in the vicinity of the rear edge of tray lock lever 5.

Further referring to FIG. 5, stopper 6, which prevents magnetic tape cartridge 1 from being inserted in the incorrect direction, is disposed at an upper portion on the left side of cartridge tray 2. Stopper 6 is formed in a triangular shape having slope portion 6-1 in order not to prevent magnetic tape cartridge 1 from being inserted when magnetic tape cartridge 1 is inserted in the correct direction.

Referring to FIGS. 6A, 6B, 6C, and 6D, loader plate 3 has bearings 3-1 to 3-6 on the left side surface, the right side surface, and the top surface. Loader plate 3 also has bearing rail slope portions 3-7, 3-8, and 3-9 and bearing rail horizontal portions 3-7', 3-8', and 3-9' on the left side surface and the right side surface. Bearing rail slope portions 3-7, 3-8, and 3-9 and bearing rail horizontal portions 3-7', 3-8', and 3-9' guide the bearings 2-1', 2-2', and 2-3', respectively. As shown in FIGS. 6A, 6B, 6C, and 6D, since cartridge tray 2 is disposed inside loader plate 3, cartridge tray 2 is slidably movable along bearing rail slope portions 3-7, 3-8, and 3-9 and bearing rail horizontal portions 3-7', 3-8', and 3-9'.

Referring to FIGS. 7A, 7B, 7C, and 7D, loader guide plate 4 has bearing rail horizontal portions 4-1, 4-2, 4-3, and 4-4, bearing rail vertical portions 4-1', 4-2', and 4-3', and upper surface bearing rails 4-5 and 4-6. Bearing rail horizontal portions 4-1, 4-2, 4-3, and 4-4, bearing rail vertical portions 4-1', 4-2', and 4-3', and upper surface bearing rails 4-5 and 4-6 guide bearings 2-1, 2-2, and 2-3 and bearings 3-1, 3-2, 3-3, and 3-4. Since loader plate 3 is disposed inside loader guide plate 4 as shown in FIGS. 7A, 7B, 7C, and 7D, loader plate 3 is slidably movable along bearing rail horizontal portions 4-1, 4-3, and 4-4 and upper surface bearing rails 4-5 and 4-6. Lock pin 4-7 is disposed at an upper left portion of loader plate 3. When lock pin 4-7 is engaged with hook 5-1, they prevent magnetic tape cartridge 1 from being improperly loaded. Thus, cartridge tray 2, loader plate 3, and loader guide plate 4 are assembled as shown in FIGS. 8A, 8B, 8C, and 8D. Loader guide plate 4 is fixed on deck base 8 as shown in FIGS. 9A, 9B, 9C, and 9D.

Referring to FIGS. 9A, 9B, 9C, and 9D, pins 8-1, 8-2, and 8-3 and reel motor 9 are disposed on deck base 8. Pin 8-1 causes cartridge lock lever 7 to swing. Pins 8-2 and 8-3 cause magnetic tape cartridge 1 to be aligned. Drive motor face gear 10 is disposed at the top of a shaft 9-1 of reel motor 9. Drive motor face gear 10 is engaged with reel face gear 1-4 of magnetic tape cartridge 1, so as to wind the medium in magnetic tape cartridge 1.

As shown in FIGS. 3A to 3D, 4, 5, 6A to 6D, 7A to 7D, 8A to 8D, 9A to 9D, and 10A to 10D, before magnetic tape cartridge 1 is loaded, cartridge tray 2 and loader plate 3 are positioned in the vicinity of the cartridge entrance. At this point, as shown in FIG. 4, since inclined portion 7-2 of cartridge lock lever 7 contacts pin 8-1 fixed on deck base 8, cartridge lock lever 7 is open. In addition, as shown in FIG. 5, since hook 5-1 of tray lock lever 5 is engaged with lock pin 4-7, the loading lock is activated so that cartridge tray 2 does not slide.

Figure 11:
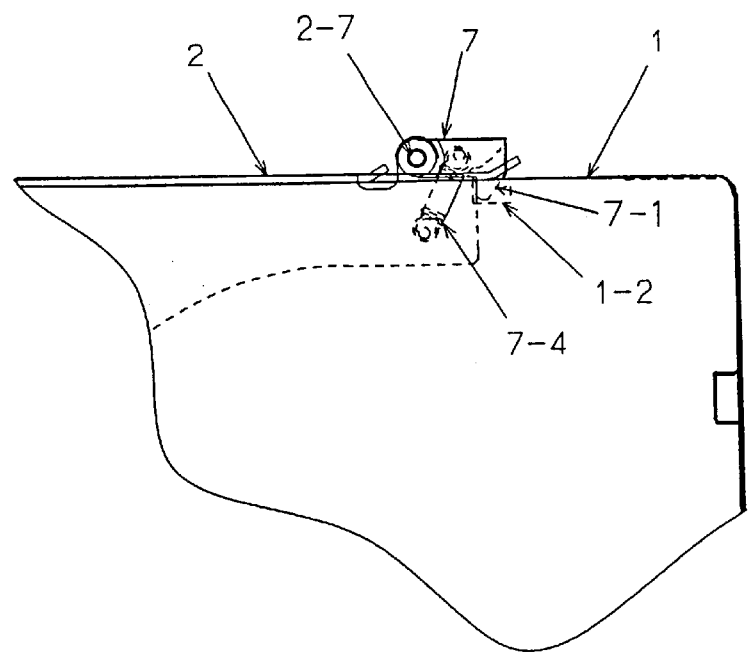
FIG. 11 is an enlarged partial plan view showing the structure of a peripheral portion of the hook shown in FIG. 3 in the case that the cartridge locking mechanism is in the lock state after the loading operation has been performed.
Figure 12:
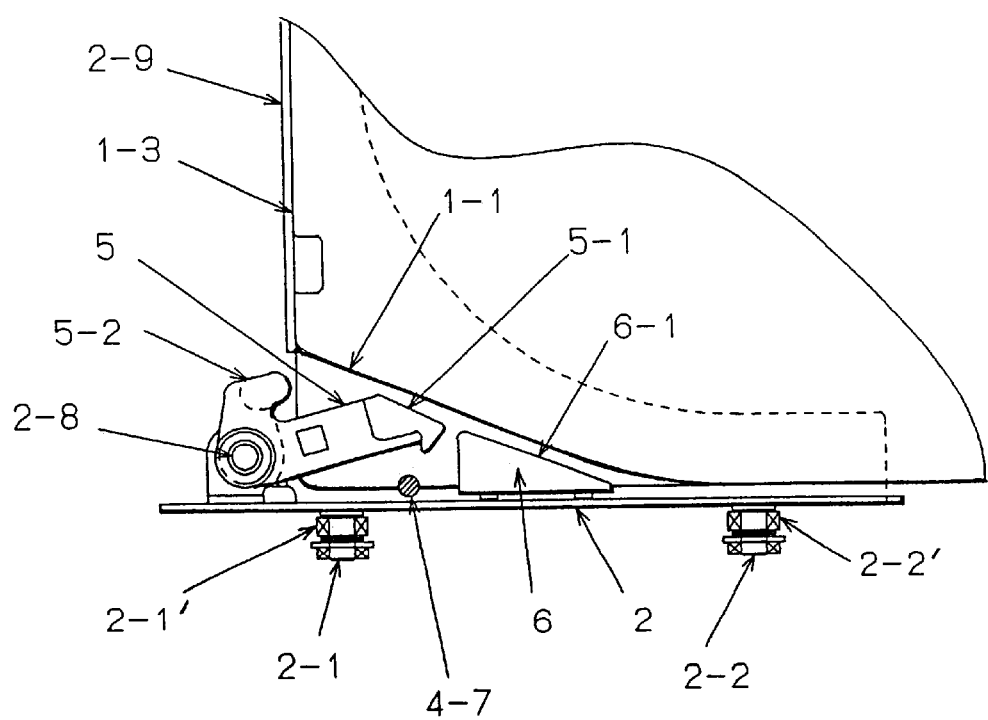
FIG. 12 is an enlarged partial plan view showing the structure of a peripheral portion of the tray lock lever shown in FIG. 3 in the case that the loading locking mechanism is in the unlock state after the loading operation has been performed.
Figure 13A:
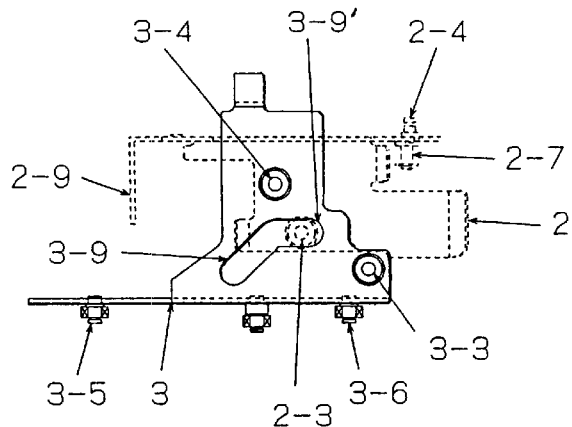
FIGS. 13A, 13B, 13C, and 13D are a left side view, a plan view, a front view, and a right side view, respectively, showing the case that the cartridge tray has been placed inside the loader plate after the loading operation has been performed according to the embodiment of the present invention.
Figure 13B:
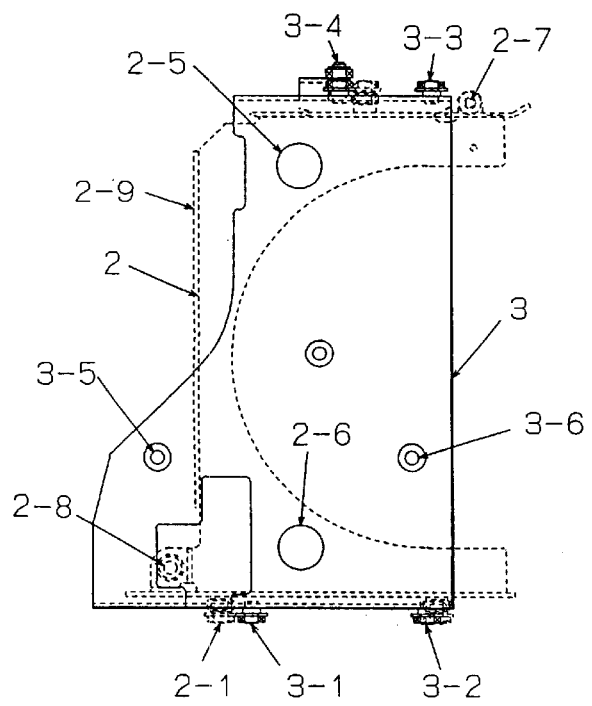
Figure 13C:
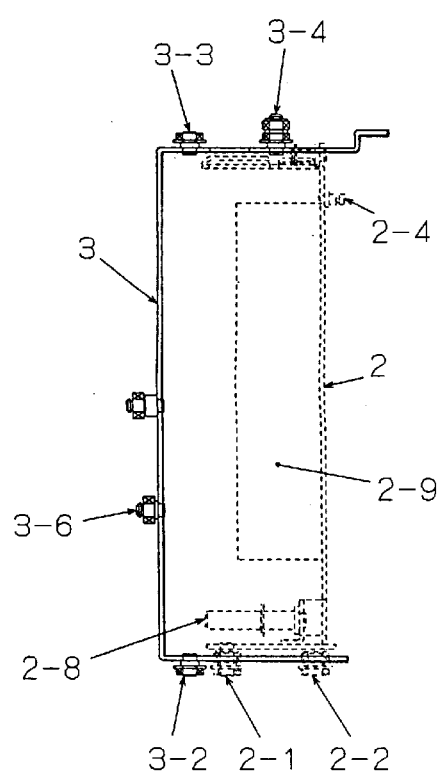
Figure 13D:
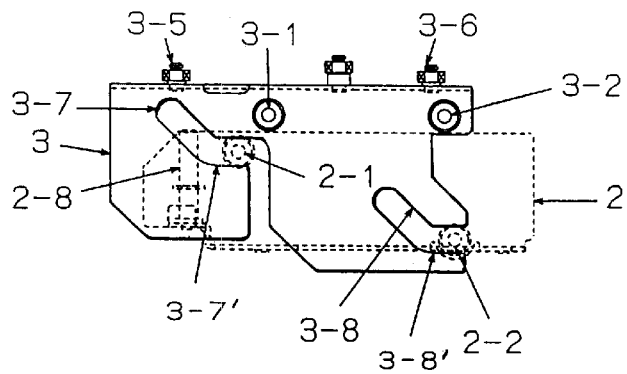
Figure 15A:
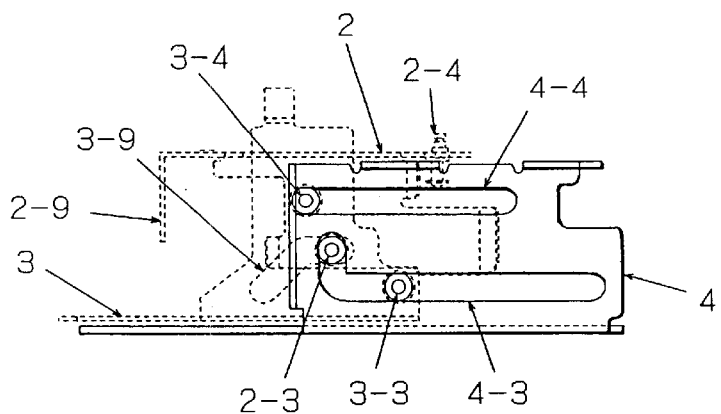
FIGS. 15A, 15B, 15C, and 15D are a left side view, a plan view, a front view, and a right side view, respectively, showing the case that the cartridge tray, the loader plate, and the loader guide plate have been assembled after the loading operation has been performed according to the embodiment of the present invention.
Figure 15B:
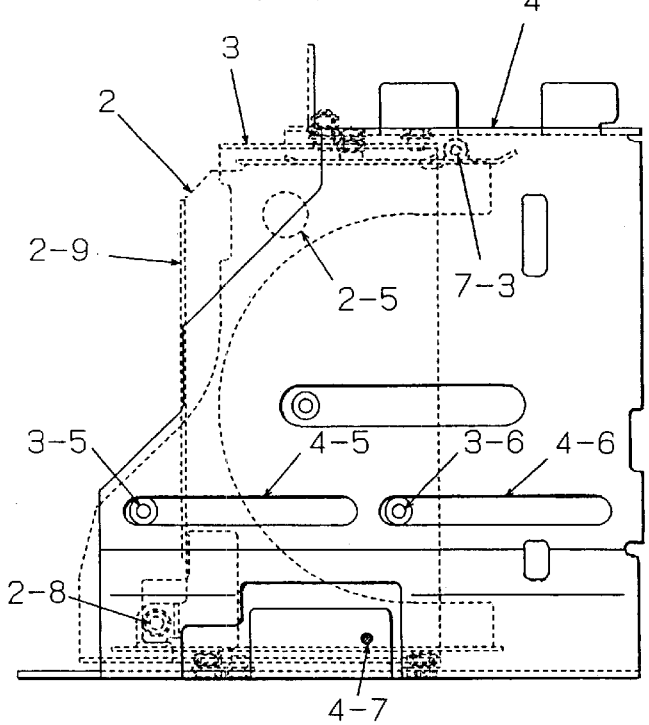
Figure 15C:
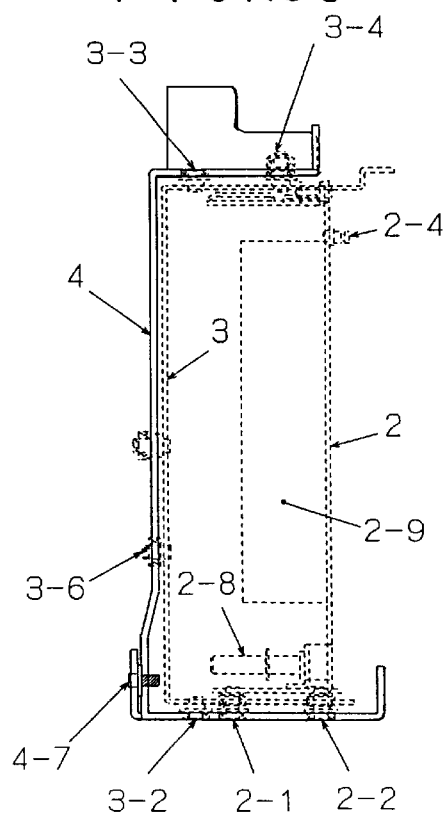
Figure 15D:
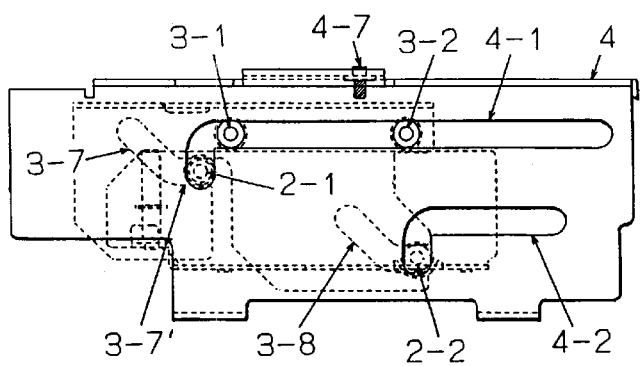

As shown in FIGS. 3A, 3B, 3C, and 3D, if magnetic tape cartridge 1 is inserted into cartridge tray 2 in the correct direction, stopper 6 enters notch 1-1 and end surface 1-3 contacts cam 5-2. Thus, cam 5-2 is pushed to a deeper position and tray lock lever 5 is rotated around pin 2-8. Thereafter, hook 5-1 is disengaged from lock pin 4-7, whereby the loading lock is deactivated. Thus, cartridge end surface 1-3 contacts cartridge tray end surface 2-9 (shown in FIG. 12). As a result, cartridge tray 2 and loader plate 3 which are pushed deeper are slid along bearing rail horizontal portions 4-1, 4-2, 4-3, and 4-4 and upper surface bearing rails 4-5 and 4-6. Thus, cartridge lock lever 7 is disengaged from pin 8-1. Spring 7-4 causes hook 7-1 to be engaged with lock hole 1-2. Thus, magnetic tape cartridge 1 is held and locked by cartridge tray 2 (shown in FIG. 11).

If magnetic tape cartridge 1 is inserted into cartridge tray 2 in the incorrect direction, since magnetic tape cartridge 1 is blocked by slope portion 6-1 of stopper 6, the loading lock cannot be deactivated.

A major feature of the present invention is that when magnetic tape cartridge 1 is inserted into cartridge tray 2 in the correct direction, the loading lock is deactivated at a close position at which the cartridge lock is activated. Owing to such mechanism, the loading malfunction can be prevented.

When magnetic tape cartridge 1 is held and locked by cartridge tray 2 with the cartridge lock lever 7, cartridge tray 2 and loader plate 3 are horizontally slid along bearing rail horizontal portions 4-1, 4-2, 4-3, and 4-4. Thereafter, bearings 2-1, 2-2, and 2-3 are guided to bearing rail vertical portions 4-1', 4-2', and 4-3', respectively. Next, with reference to FIGS. 13A to 13D, 14A to 14D, 15A to 15D, and 16A to 16D, the relative operation of cartridge tray 2 against loader plate 3 will be explained. When bearings 2-1, 2-2, and 2-3 are guided to bearing rail vertical portions 4-1', 4-2', and 4-3', bearings 2-1', 2-2', and 2-3' are moved along bearing rail slope portions 3-7, 3-8, and 3-9, respectively. As a result, cartridge tray 2 is moved downwardly. Since bearing 3-1 and 3-2 are moved along bearing horizontal portion 4-1, bearing 3-3 is moved along bearing horizontal portion 4-3, and bearing 3-4 is moved along bearing rail horizontal portion 4-4, loader plate 3 is horizontally moved. Lateral position of loader plate 3 is restricted by bearings 3-5 and 3-6 and upper surface bearing rails 4-5 and 4-6. At the loading complete position shown in FIGS. 16A to 16D, cartridge tray 2 has been moved to bearing rail horizontal portions 3-7', 3-8', and 3-9', thereby preventing cartridge tray 2 from being vertically moved.

When cartridge tray 2 is moved to the loading complete position shown in FIGS. 16A to 16D, drive motor face gear 10 is engaged with reel face gear 1-4. At this point, aligning pins 8-2 and 8-3 enter aligning holes 1-5 and 1-6 of magnetic tape cartridge 1 through holes 2-5 and 2-6, respectively, so that drive motor face gear 10 is securely engaged with reel face gear 1-4 (shown in FIGS. 16A to 16D).

As was explained above, according to the present invention, different structural members are assigned the loading lock function and the misinsertion preventing mechanism. Therefore, the mis-insertion preventing mechanism is more effectively accomplished. In addition, the timing at which the loading lock is deactivated is almost synchronized with the timing at which the cartridge lock is activated. Further, it is prevented that reel face gear 1-4 is improperly engaged with drive motor face gear 10. Thus, an ideal loading operation has been realized.

Although the present invention has been shown and explained with respect to the best mode of embodiment thereof, it should be understood by those skilled in the art that the foregoing and various other changes, omissions, and additions in the form and detail thereof may be made therein without departing from the spirit and scope of the present invention.

What is claimed is:

1. A cartridge mis-insertion preventing mechanism, comprising:
    a cartridge tray into which a cartridge is insertable;
    a loader plate into which said cartridge tray is insertable;
    a cartridge locking mechanism for locking said cartridge to said cartridge tray;
    a loading locking mechanism for preventing said cartridge tray and said loader plate from being inserted into a loader guide plate; and
    a restricting mechanism for changing said loading locking mechanism from a lock state to an unlock state only when said cartridge has been inserted into said cartridge tray in a correct direction;
        wherein said cartridge tray and said loader plate are inserted into said loader guide plate along with said cartridge when said cartridge is further inserted after said loading locking mechanism has been changed from the lock state to the unlock state;

wherein before said cartridge is inserted into said cartridge tray, said cartridge locking mechanism is in an unlock state;

wherein when said cartridge tray and said loader plate along with said cartridge have been inserted into said loader guide plate, said cartridge locking mechanism is changed from the unlock state to a lock state; and wherein before said cartridge is inserted into said cartridge tray, said loading locking mechanism is in the lock state.

2. The cartridge mis-insertion preventing mechanism as set forth in claim 1, wherein said cartridge locking mechanism comprises:

a cartridge lock lever which has a first hook engageable with a lock hole of the cartridge and is rotatably disposed on said cartridge tray;

a first pin for rotating said cartridge lock lever to an angle at which said lock hole is disengaged from said first hook when said cartridge tray and said loader plate have not been inserted into the loader guide plate; and a first spring for rotating said cartridge lock lever in a direction reverse to the direction of the rotation by said first pin.

3. The cartridge mis-insertion preventing mechanism as set forth in claim 1, wherein said loading locking mechanism comprises:

a tray lock lever which has a cam portion and a second hook and is rotatably disposed on said cartridge tray, said cam portion being pushed by an end surface in the inserting direction of said cartridge;

a second pin fixed and engageable with the second hook; and a second spring for rotating said tray lock lever so that said second hook is engaged with said second pin;

wherein when said cam portion is pushed by said end surface in the inserting direction of said cartridge, said tray lock lever is rotated so that said second lever is disengaged from said second pin.

4. The cartridge mis-insertion preventing mechanism as set forth in claim 1, wherein said restriction mechanism is a stopper disposed on said cartridge tray;

wherein when said cartridge is inserted into said cartridge tray in an incorrect direction, said cartridge contacts said stopper; and wherein when said cartridge is inserted into said cartridge tray in said correct direction, said cartridge does not contact said stopper.

5. The cartridge mis-insertion preventing mechanism as set forth in claim 1, wherein the operation in which said cartridge tray and said loader plate are inserted into said loader guide plate along with said cartridge is caused by an end surface of said cartridge tray being pushed by an end surface in the inserting direction of said cartridge.

6. A loading locking mechanism comprising:

a tray lock lever which has a cam portion and a hook and is rotatably disposed on a cartridge tray, said cam portion being pushed by an end surface in the inserting direction of a cartridge;

a pin fixed and engageable with said hook; and a spring for rotating said tray lock lever so that said hook is engaged with said pin;

wherein when said cam portion is pushed by said end surface in the inserting direction of said cartridge, said tray lock lever is rotated so that said lever is disengaged from said second pin.

* * * * *